(12) United States Patent
Boczon et al.

(10) Patent No.: US 8,147,738 B2
(45) Date of Patent: Apr. 3, 2012

(54) EXTRUSION GRANULATION METHOD AND DEVICE, AND GRANULATE PRODUCED THEREFROM

(76) Inventors: Jaroslaw Boczon, Grossostheim (DE); Andreas Doll, Aschaffenburg (DE); Sven Fenchel, Babenhausen/Langstadt (DE); Brent Allan Culbert, Wil (CH); Fernando Eusebio, Uttwil (CH); Franziska Morganti, Zürich (CH)

( * ) Notice: Subject to any disclaimer, the term of this patent is extended or adjusted under 35 U.S.C. 154(b) by 257 days.

(21) Appl. No.: 12/516,563

(22) PCT Filed: Nov. 12, 2007

(86) PCT No.: PCT/EP2007/009768
§ 371 (c)(1),
(2), (4) Date: Jan. 12, 2010

(87) PCT Pub. No.: WO2008/064768
PCT Pub. Date: Jun. 5, 2008

(65) Prior Publication Data
US 2010/0133717 A1 Jun. 3, 2010

(30) Foreign Application Priority Data

Nov. 27, 2006 (DE) .......................... 10 2006 055 914
Jun. 15, 2007 (DE) .......................... 10 2007 027 543

(51) Int. Cl.
*B29B 9/06* (2006.01)
(52) U.S. Cl. ........................... 264/143; 425/71; 425/308
(58) Field of Classification Search .................. 264/143; 425/71, 308
See application file for complete search history.

(56) References Cited

U.S. PATENT DOCUMENTS

| | | | | |
|---|---|---|---|---|
| 5,146,822 A | * | 9/1992 | Noda et al. ........................ | 83/22 |
| 5,628,947 A | * | 5/1997 | Keilert ......................... | 264/143 |
| 2009/0068467 A1 | * | 3/2009 | Kimura .......................... | 428/402 |

FOREIGN PATENT DOCUMENTS

| | | |
|---|---|---|
| DE | 199 33 476 | 9/1968 |
| DE | 28 14 113 | 10/1979 |
| DE | 43 14 162 | 4/1994 |
| DE | 197 39 747 | 3/1999 |
| EP | 1 551 609 | 9/2006 |
| WO | 03/031133 | 4/2003 |

* cited by examiner

*Primary Examiner* — Joseph Del Sole
*Assistant Examiner* — David N Brown, II
(74) *Attorney, Agent, or Firm* — Pillsbury Winthrop Shaw Pittman LLP

(57) ABSTRACT

The invention relates to a method for the production of granulate grains of polymers from thermoplastic polyesters or copolyesters from a polyester melt using an extrusion granulator. The polyester melt is fed to nozzles of the extrusion granulator and then, with draw-in rollers, to the granulation device via an extraction section as extrusions exiting from the nozzle, wherein, e.g., an extrusion extraction speed is set by the draw-in rollers. The invention also relates to an improved extrusion granulator according to the invention having a wave device between the nozzles and the extraction channel, and granulate grains produced according to the method according to the invention.

21 Claims, 2 Drawing Sheets

Figure 1:
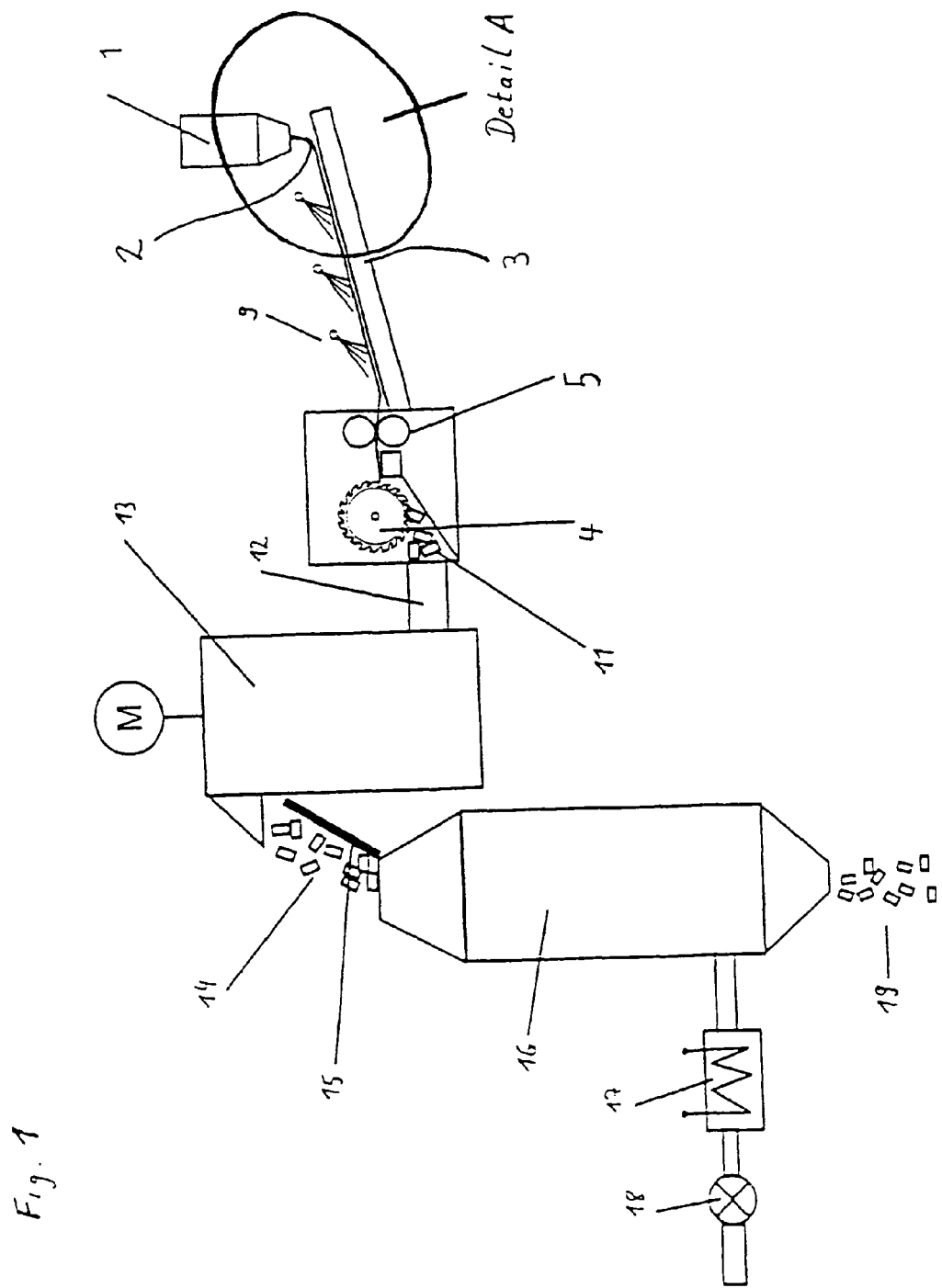

Fig. 2  Detail A
a)
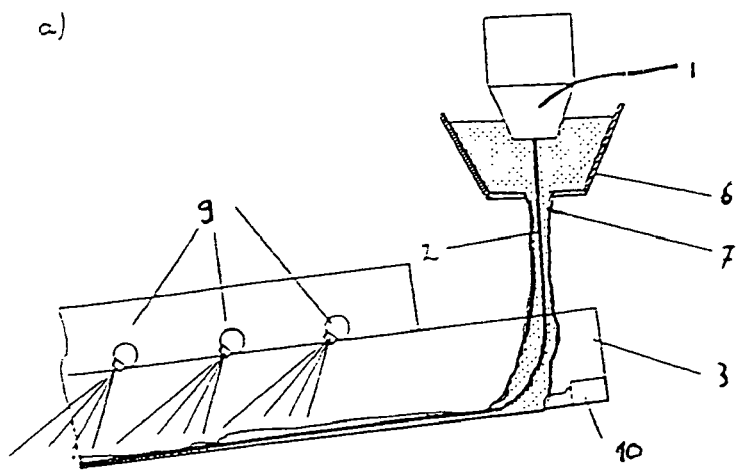
b)
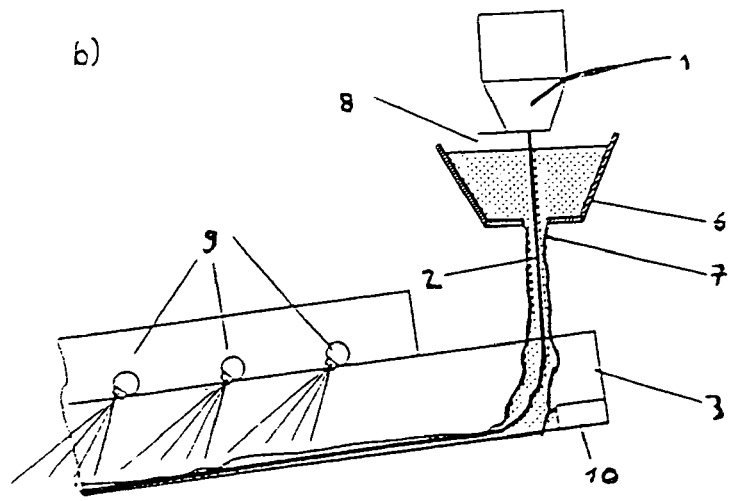
c)
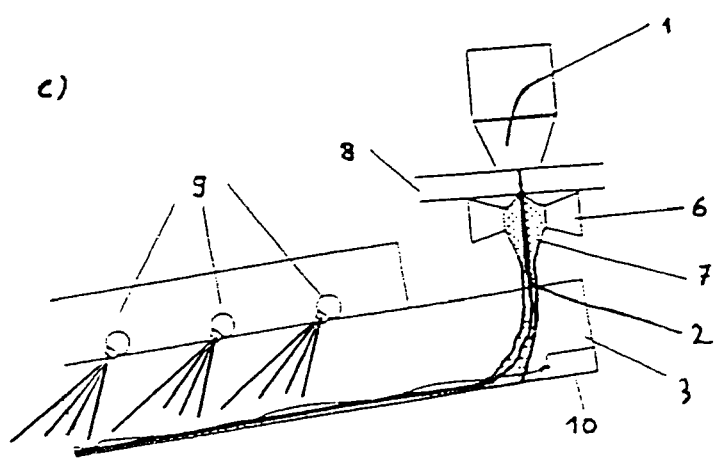

EXTRUSION GRANULATION METHOD AND DEVICE, AND GRANULATE PRODUCED THEREFROM

The invention relates to a process for the production of pellets of polymers of thermoplastic polyesters or copolyesters from a polyester melt with a strand pelletizer in which the polyester melt is supplied to die orifices and is thereafter supplied in the form of strands via a discharge section to the pelletization device with draw-in rollers, wherein a strand removal speed $v_{ab}$ is adjusted, for example, via the draw-in rollers. The invention relates further to an improved strand pelletizer as well as to pellets produced by the process according to the invention.

Corresponding strand pelletizers are known, for example, from the applicant itself, which manufactures and distributes such strand pelletizers, for example under the product name Rieter USG 600.

Generally, the production of pellets of polymers of thermoplastic polyesters or copolyesters from a polyester melt confronts those skilled in the art with certain difficulties arising, in particular, from the specific material properties of said polymers of thermoplastic polyesters or copolyesters. For instance, therefrom produced pellets have a particular tendency, if heated above the glass transition temperature of the material, to clump together at their surfaces, this rendering further processing virtually impossible. In order to prevent such clumping, for example, additional and complex heat treatment stages are carried out in order to effect a crystallization of the produced pellets, such heat treatment sometimes also comprising process steps in which use is made of the sensible heat still contained in the pellets. All such processes, however, are very costly and time-consuming and are also, particularly because of the great sensitivity of the process steps with regard to temperature adjustment, feasible only with a great amount of outlay on temperature control.

Also, special processes for the production of pellets of polymers of thermoplastic polyesters using materials with specific properties, such as low-viscosity polyesters, are very costly and time-consuming and are fault-prone with regard to their controllability, more particularly, for example, with regard to the controllability of the material properties. A corresponding process is known, for example, from European patent EP 1 551 609 B1, which describes a process for the production of polyester resins of very low intrinsic viscosity, wherein use is made of an essentially conventional strand pelletization process employing a commercially available strand pelletizer. Strands of low viscosity and correspondingly low melt strength are described. A short distance between die orifice exit and entry into a cooling medium serves to guarantee the stabilization of the strands. A change of the surface structure, as well as the freezing of surface effects, caused by heavy mechanical loading of the strands as they exit the die orifices, is not described.

German published patent application DE 28 14 113 discloses a device for the pelletization of plastic strands in which an underwater pelletization device is presented which is optimized with respect to the routing of the cooling medium in the region of its cutter and die plates in order therein to guarantee the aforementioned critical adjustment of the required temperature ranges.

From patent application WO 03/031133 it is known to produce on pellets a surface layer with increased nucleation density, this resulting in improved processing conditions in downstream thermal processes. For this purpose, however, it is first necessary to adjust a defined moisture profile. Subsequently, water is used as the nucleation medium during crystallization, this producing generally part-crystalline pellets of increased nucleation density at the surface. The similar production of a part-crystalline surface structure through the action of water is described in German patent application DE 19933476, wherein, once again, the surface crystallinity is accomplished in the course of crystallization of the whole strands and therefore the therefrom resulting pellets. In both cases, the freezing of surface effects, or the production of amorphous pellets of modified surface structure, is not described.

On the whole, therefore, there is at present no satisfactory process (or corresponding device) capable of producing reliably further-processable pellets of polymers of thermoplastic polyesters or copolyesters from a polyester melt with a strand pelletizer in as simple and cost-effective a manner as possible. This is true, more particularly, with regard to the desired maximum-possible mass throughputs, because, in this case, the adjustment of thermal conditions is made all the more difficult, and also, for example, the frequently low viscosity of the polyester results in problems, such as strand tearing, clumping of the strands and/or pellets or similar.

The object of the present invention, therefore, is to provide a process and device for the production of pellets of polymers of thermoplastic polyesters or copolyesters from a polymer melt with a strand pelletizer, said process and device overcoming the disadvantages of the prior art and providing the cost-effective and simplified production of corresponding pellets that can be simply and reliably further processed.

The embodiments herein are achieved by a process having the features as follows:

1) Method for producing granules of polymers of thermoplastic polyesters or copolyesters from a polyester melt with a strand pelletizer, in which the polyester melt is fed to nozzles and subsequently is fed as stands through a drawings section to a granulating device with feed rolls, wherein a strand drawings speed $v_{ab}$ of the strands is set by means of the feed rills, characterized in that the strands exit the nozzles with an exit speed $v_{aus}$ of at least 110 m/min, wherein a ratio of the exit speed $v_{aus}$ divided by the area f of the nozzle opening of a given nozzle $v_{aus}/f$ is set such that the condition $v_{aus}/f \geq 30$ m/(min×mm²) is fulfilled, and wherein the strands thus exiting applicable nozzles are brought in contact with a coolant fluid;

2) Method for producing granules of polymers of thermoplastic polyesters of copolyesters from a polyester melt using a strand pelletizer, in which the polyester melt is fed to nozzles and subsequently is fed as strands through a drawing section to a granulating device with feed rolls, characterized in that the diameter d and/or the length l of the nozzle opening of the applicant nozzles is set such that the ration l/d fulfills to the condition $l/d \leq 1$, and in that the strands exiting the nozzles are brought into contact with a coolant fluid through an air gap, wherein the length of the air gap is set to a maximum of 30 mm;

3) Method for producing granules of polymers of thermoplastic polyesters or copolyesters from a polyester melt using a strand pelletizer, in which the polyester melt is fed to nozzles and subsequently is fed as strands through a drawing section to a granulating device with feed rolls, characterized in that the diameter d and/or the length l of the nozzle opening of the applicable nozzles is set such that the ration l/d fulfills the condition $l/d \geq 1$, and in that the strands exiting the nozzles are brought into contact with a cooling fluid directly at the nozzle exit;

4) Method for producing granules of polymers of thermoplastic polyesters or copolyesters from a polyester melt using a strand pelletizer, in which the polyester melt is fed to nozzles and subsequently is fed as strands through a drawing section to a granulating device with feed rolls, characterized in that the nozzle openings are designed such that a sharp cross-sectional narrowing takes place directly before the nozzle exit, wherein a relationship of the area F at the inlet of the nozzle bore as measured at a point located at the distance L before the exit of the nozzle opening where L<8 mm, divided by the area f of the nozzle opening of a given nozzle, is set such that the condition $F/f \geqq 3$ is fulfilled, and in that the strands exiting the nozzles are brought into contact with the coolant fluid through an air gap, wherein the length of the air gap is set to a maximum of 30 mm;

5) Method for producing granules of polymers of thermoplastic polyesters or copolyesters from a polyester melt using a strand pelletizer, in which the polyester melt is fed to nozzles and subsequently is fed as strands through a drawing section to a granulating device with feed rolls, characterized in that the nozzle openings are designed such that a sharp cross-sectional narrowing takes place directly before the nozzle exit, wherein a relationship of the area F at the inlet of the nozzle bore as measured at a point located at the distance L before the exit of the nozzle opening where L<8 mm, divided by the area f of the nozzle opening of a given nozzle, is set such that the condition $F/f \geqq 3$ is fulfilled, and in that the strands exiting the nozzles are brought into contact with the coolant fluid directly at the nozzle exit. The embodiments herein include a strand pelletizer having the features as follows:

1) Strand pelletizer for producing granules of polymers of thermoplastic polyesters or copolyesters from a polyester melt, having nozzles (1) through which the polyester melt emerges as strands (2), having a drawing trough (3) carrying the strands under the application of a fluid, having a granulating device (4) and feed rolls (5) which draw the strands (2) from the nozzles (1) and feed them through the drawing trough (3) to the granulating device (4), characterized in that a wave device (6) is provided between the nozzles (1) and the drawing trough (3), which wave device applies a coolant fluid wave (7) to the strands (2) exiting from the applicable nozzles (1) before the strands (2) are carried through the drawing trough (3) to which a fluid is applied. Pellets according to the embodiments herein as follows:

1) Granules of polymers of thermoplastic polyesters or copolyesters produced using a strand pelletizer, characterized in that the granules are essentially amorphous, wherein a crystallinity of whole granules measured by DSC consists of less than 10%, and in that the granules have a semicrystalline structure in the region of their lateral surface; and 2) Granules of polymers of thermoplastic polyesters or copolyesters produced using a strand pelletizer, characterized in that the granules are essentially amorphous, wherein a crystallinity of whole granules measured by DSC consists of less than 10%, and in that the granules have a strongly nucleated structure in the region of their lateral surface.

With the processes according to the invention, it is possible to extrude, for example, crystallizable or at least partially crystallizable polymers of thermoplastic polyesters or copolyesters from a polyester melt and to pelletize and to cool same, it being the case that, also during their further use, the pellets do not simply clump together.

Typical examples of the polyesters are polyethylene terephthalate (PET), polybutylene terephthalate (PBT) and polyethylene naphthalate (PEN), which are used either as homopolymer or as copolymers.

Additives can be admixed to the polymer. Suitable additives are, for example, catalysts, dyes and pigments, UV blockers, processing aids, stabilizers, blow tough modifiers, foaming agents of chemical or physical type, fillers, nucleating agents, flame retardants, plasticizers, barrier- or mechanical-properties-improving particles, reinforcing bodies such as balls or fibres, as well as reactive substances such as oxygen absorbers, acetaldehyde absorbers or molecular-weight-increasing substances etc.

If foaming agents are used, it must be ensured that they do not lead to substantial foaming and, therefore, expansion of the extruded strands and consequently of the resulting pellets. Expansion should in any case be kept below 10%, preferably below 5%.

If the thermoplastic polyester is a polyethylene terephthalate or one of the copolymers thereof, it should preferably have an intrinsic viscosity of 0.3 to 1 dl/g, measured in a mixture of phenol:dichloro benzene (1:1). Particularly preferred are polyethylene terephthalates with an intrinsic viscosity greater than 0.4 dl/g and still more preferably greater than 0.48 dl/g.

In contrast to the above-described prior art, in which sophisticated temperature control of the therein employed processes and/or the selective adjustment of a moisture profile in strands/pellets in the therein employed equipment is absolutely essential, wherein the mechanical loading of the strands is preferably minimized when the strands are being produced from the corresponding polyester melt in order to prevent the described effects, such as strand tearing or negative influences on account of the viscosity of the extruded material, e.g. through minimization of the expansion of the strand and prevention of shear effects at the surface of the strand, it is precisely the case with the hereinbelow described processes according to the invention that desired material properties and/or surface properties of the extruded strand and of the therefrom produced pellets are achieved specifically by increasing the mechanical loading, e.g. through strand expansion and/or production of shear profiles, said desired material properties and/or surface properties being "frozen" by means of suitable cooling, with the consequence that, also in processes operated with high mass throughputs, said properties that are achieved or achievable according to the invention will prevent clumping of the therefrom produced pellets in simple, effective and reliable manner. The material properties that are correspondingly achievable according to the invention can act in further processing steps as effective nucleation germs for crystallization of the thus produced pellets, wherein crystallization need not be effected through complex adjustment of material properties, e.g. viscosity, or through complex processes requiring costly and time-consuming temperature adjustment and temperature control, as required by the processes of the prior art.

The amorphous pellets produced by the processes according to the invention have a surface layer with a highly nucleated structure, as a consequence of which they have a reduced tendency to stick in subsequent crystallization processes. The material properties achieved according to the invention can also lead already to a partially crystalline structure at and below the surface of the strand and the therefrom produced pellets. Also in this case, subsequent crystallization can be effected in simpler manner than is customary in the prior art.

In a process according to the invention for the production of pellets of polymers of thermoplastic polyesters or copolyesters from a polyester melt with a strand pelletizer in which the polyester melt is supplied to the die orifices of the strand pelletizer and is thereafter supplied in the form of strands via a discharge section of the strand pelletizer to the actual pelletization device with draw-in rollers, wherein a strand removal speed $v_{ab}$ is adjusted via the draw-in rollers of the strand pelletizer, it is provided according to the invention that the strands exit the die orifices at an exit speed $v_{aus}$ of at least 110 m/min, which is approximately between three and ten times as fast as the exit speed known according to the prior art. Furthermore, in the process according to the invention, a relationship of exit speed $v_{aus}$ divided by the area f of the die orifice opening of a respective die orifice $v_{aus}/f$ is so adjusted that said relationship according to the invention satisfies the condition $v_{aus}/f \geq 30$ m/(min×mm$^2$). In the process according to the invention, the strands thus issuing from the respective die orifices are (then) brought into contact with a cooling fluid.

The relationship, newly introduced in the process according to the invention, of exit speed $v_{aus}$ divided by the area f of the die orifice opening of a respective die orifice $v_{aus}/f$, which relationship is, according to the invention, so adjusted as to satisfy the condition $v_{aus}/f \geq 30$ m/(min×mm$^2$), is an expression which, contrary to the prior art, sets a relatively high exit speed $v_{aus}$ of the polyester melt in relation to a relatively small area f of the die orifice opening of a respective die orifice, which, according to the invention, signifies a certain mechanical loading of the extruded polyester melt.

The processes according to the invention intentionally generate a mechanical loading of the extruded material while the strands are being formed, wherein, according to the invention, said mechanical loading gives rise to certain stresses in the strand material and/or in the pellets produced from said strand material, said stresses being "frozen" through as early a contact as possible with a cooling fluid.

The freezing of the stresses at and below the surface of the strand and/or pellets results in a layer with high nucleation density, i.e. a layer with a high number of crystal germs. According to a preferred embodiment of the present invention, said layer has a thickness of at least 5 μm, more particularly at least 10 μm. Generally, the surface layer is limited to no more than 10% of the pellet radius or approximately 100 μm.

Through subsequent quenching followed by thermal crystallization in a hot gas stream, the nucleation density can be made visible by means of thin section microscopy, it being desired to produce an at least ten times higher nucleation density in the surface layer than in the more stress-free region of the material, the nucleation density being calculated according to 6/PI/dc$^3$, where dc corresponds to the mean crystal diameter.

At the same time, the thus generated stresses can lead to local stretching and therefore to spontaneous crystallization. Since the stresses occur above all in the region of a maximum shear field formed on the strand surface upon extrusion in the die orifice, the crystalline layer is limited to the outer layer of the strand and, therefore, to the lateral layer of the pellets. According to a preferred embodiment of the present invention, said layer has a thickness of at least 5 μm, more particularly at least 10 μm. Generally, the surface layer is limited to no more than 10% of the pellet radius or approximately 100 μm. The crystallization degree of a thus part-crystallized surface layer is desired to be at least 10%, more particularly at least 15%.

Said crystallization is in contrast to the essentially amorphous state of the produced strands and the therefrom formed amorphous pellets, wherein pellets are described as amorphous as long as their DSC (Differential Scanning Calorimetry)-measured crystallinity is below 10%, more particularly below 7% and preferably below 5%. Pellets that are in a hot state after pelletization must be immediately quenched in order to measure the crystallinity. For this purpose, the DSC measurement is performed at a heat-up rate of 10° C./min from 20 to 300° C., and, in order to calculate the crystallinity, the crystallization heat is subtracted from the melting heat and divided by the melting heat for 100% crystalline polymer. For polyethylene therephtalates, 118 J/g is used for this purpose.

In order to guarantee sufficient crystallization at the strand surface, it is necessary to prevent too rapid a quenching, this being made possible by raising the temperature of the cooling fluid.

Particularly the cooling fluid in the discharge section may, for this purpose, have a temperature T in the range T1 to T2, where T1=Tg−20° C., more particularly Tg−10° C., and T2=Tg+70° C., more particularly Tg+30° C. and where Tg corresponds to the glass transition temperature of the thermoplastic polyester.

In comparison with the prior art, the processes according to the invention attach importance to an increased mechanical loading of the extruded strand, it being desired, in particular, for example, to achieve maximum possible expansion of the strand after it has exited from the die orifice. In this connection, the applicant has found that, for example, the very high exit speed and the newly defined process parameter of the relationship of the strand exit speed $v_{aus}$ over area f of the die orifice opening through which the respective strand exits, should be above the aforementioned value for a respective die orifice opening. Said new parameter, as well as the limit condition given therefor, provides the guarantee, according to the invention, that, while the extruded strands are exposed to a mechanical loading, this does not result, for example, in strand tearing or similar. With the process according to the invention, which comprises the above-described features, it is still possible—assuming identical polymer density, with identical mass throughput in comparison with prior-art processes, and with comparable dimensions of the produced pellets—in particularly simple manner to produce pellets with desired properties, more particularly with regard to the prevention of clumping of the pellets, according to the invention.

In a process according to the invention, upon exit of the strands from the respective die orifices, a stretching $V=(v_{ab}-v_{aus})/v_{aus}$ of the issuing strands can be so adjusted, more particularly through adjustment of the strand removal speed $v_{ab}$ and/or of the exit speed $v_{aus}$ of the strands, that the condition $V \leq 0$ is satisfied. Said stretching parameter V according to the invention with the corresponding limit value is a measure of the expansion of the strands thus correspondingly produced by the process according to the invention, it being the case that, purely theoretically—although such considerations were not made therein—previous prior-art processes have always had values of V much higher than 0. According to the prior art, therefore, it was precisely the intention to prevent any expansion of the strands of the kind characterized by the limit condition according to the invention.

In a process according to the invention, the exit speed $v_{aus}$ of the respective issuing strands at the die orifice is adjusted in a range from at least 110 m/min to at most 600 m/min, preferably in a range from at least 110 in/min to at most 400 m/min. This makes it possible in simple manner to achieve reliably high throughput rates.

Preferably, in the process according to the invention, the strand removal speed $v_{ab}$ is adjusted, through corresponding adjustment of the speed of the draw-in rollers, in a range from at least 80 m/min to at most 350 m/min.

In order simply and reliably to achieve the mechanical properties, achieved according to the invention, of the extruded strands and/or of the therefrom produced pellets, it is possible in the processes according to the invention preferably for the area f of the respective die orifice opening of the respective die orifice to be adjusted to less than 12 mm², preferably to less than 7 mm², more preferably to less than 4 mm². Consequently, said values are approximately one-half to one-third of those values normally used in the prior art.

As already discussed hereinbefore, it is possible, according to the invention, by increasing the mechanical loading, e.g. by generating shear profiles, to achieve desired material properties and/or surface properties of the extruded strand and of the therefrom produced pellets and to "freeze" said properties by means of appropriate cooling. Particularly if using round die orifice openings, yet also generally in the case of die orifice openings of any desired cross-sectional shape that provide the possibility of calculating a so-called substitute diameter (this will be generally familiar to the person skilled in the art and is not described in any greater detail hereinbelow), this can be achieved in that the relationship of the diameter or substitute diameter d to the length l of the die orifice opening of the respective die orifice is so adjusted according to the invention, through variation of the diameter d and/or length l of the die orifice opening, that the relationship l/d satisfies the condition $l/d \leq 1$, preferably satisfying the condition $l/d \leq 0.7$, more preferably satisfying the condition $l/d \leq 0.5$ and still more preferably satisfying the condition $l/d=0.3$.

Generally, a die orifice device may comprise a multiplicity of die orifices (die orifice holes), in each of which is formed a strand. The individual die orifices are connected to a distributor chamber, from where the polymer melt is distributed to the individual die orifices. Normally, the die orifices have a larger diameter on their inlet side than the die orifice opening at the exit. Accordingly, there is a reduction in cross-section, which may also take place over a plurality of stages and which normally leads to a cylindrical die orifice opening.

An increased mechanical loading of the extruded material can also be achieved according to the invention in that there is a sharp reduction in cross-section immediately before the die orifice exit. In order to calculate a sufficiently sharp reduction in cross-section, a relationship can be formed between a cross-sectional area F in the entry region to the die orifice divided by the cross-sectional area f of the die orifice opening at the exit. Since the inlet geometry of a die orifice may vary greatly in design and since there is not always a cylindrical die orifice hole, the entry area F is measured at a defined point that is situated in front of the exit from the die orifice opening by a distance L. According to the invention, L is less than 8 mm, preferably less than 7 mm and more preferably less than 6 mm. A sufficient mechanical loading will be achieved if, according to the invention, the relationship F/f satisfies a value of $\geq 3$, preferably $\geq 5$, more preferably $\geq 10$ and still more preferably $\geq 20$. In the case of sufficiently small die orifice openings, F/f can reach up to 1000; however, values below 250 are preferred.

With regard to bringing the strands produced according to the invention into contact with the cooling fluid, it is preferred that the strands issuing from the die orifices are brought across an air gap into contact with the cooling fluid, the length of the air gap being very small and being adjusted to no more than 30 mm, preferably to no more than 10 mm, more preferably to no more than 5 mm and still more preferably to no more than 2 mm. Alternatively, it is possible to provide no air gap, with the consequence that, according to the invention, the strands issuing from the respective die orifices will come immediately into contact with the cooling fluid.

According to the invention, any type of suitable cooling fluid is conceivable; however, water is particularly preferred as cooling fluid.

The cooling fluid may be either in a bath or in a flooding device, or it can be applied to the strands from outside. Immediately before coming into contact with the extruded strands, the cooling fluid must be adjusted to a temperature that guarantees the freezing of the surface structure generated by the mechanical loading. Although cooling fluids can be used up to just below their boiling temperature, water up to approximately 95° C., the preferred temperatures are in the range of the glass transition temperature of the thermoplastic polyester, typically between 50 and 90° C., more particularly between 60 and 85° C. The temperature upon initial contact with the cooling fluid may correspond to the fluid temperature in the downstream discharge section or may be individually controlled.

In the processes according to the invention, the polyester melt is or can be supplied to the die orifices at a melt temperature $T_{Schmelze} \leq 280°$ C., preferably $\leq 70°$ C., more preferably at a melt temperature $T_{Schmelze}$ in the range $260°$ C.$\leq T_{Schmelze} \leq 280°$ C., still more preferably in the range $260°$ C.$\leq T_{Schmelze} \leq 270°$ C. This makes it possible for the desired properties of the pellets to be achieved in particularly simple and reliable manner.

As already referred to hereinbefore, a die orifice plate will normally comprise a plurality of die orifices (die orifice holes). The die orifice plate, therefore, covers at least the length of the die orifice holes. Preferably, the temperature of the die orifice plate can be individually controlled, as a result of which the temperature of the die orifices can be individually controlled. In order to support the formation of the mechanical loading, the die orifice plate temperature and therefore the die orifice temperature is preferably adjusted to below the melt temperature. Preferred are die orifice temperatures from 10 to 60° C., particularly more than 15° C. below the melt temperature. Since thermoplastic polyesters or copolyesters are normally produced and processed significantly above their melting point, the die orifice plate temperature and therefore the die orifice temperature is normally in the range of or below the crystalline melting temperature of the polyester or copolyester, it being possible to employ temperatures from 20° C. above to 50° C. below the melting temperature, wherein the melting temperature is the peak temperature of the crystalline melting peak as measured by DSC in the second pass with a heating rate of 10° C./min. If processing polyethylene terephthalate and its copolymers, die orifice plate temperatures are adjusted in the range from 200 to 270° C., more particularly in the range from 210 to 260° C. and preferably below 250° C. Although it is also possible to use electrically heated die orifice plates, heating by means of heat transfer media is preferred for individual control of the die orifice plate temperature.

With regard to the resulting properties of the pellets in relation to non-clumping, it is particularly effective if, in the process according to the invention, the pelletization of the strands in the pelletizer is preferably followed immediately, for example, by heat treatment, crystallization, tempering, conditioning, degassing and/or solid-phase polycondensation of the thus produced pellets, preferably after the pellets have been separated from the cooling fluid.

It is of advantage according to the invention to bring the cooling fluid only briefly into contact with the strands and to separate the cooling fluid quickly from the pellets. For this purpose, the contact time of the polyester material with the cooling fluid should be in the range from 0.3 to 10 seconds, preferably being in the range from 1 to 4 seconds, still more preferably being in the range from 1 to 3 seconds. If water is used as the cooling fluid for cooling a polyethylene terephthalate or a copolyester thereof, then, after separation, the pellets have a temperature from 100 to 170° C., more particularly from 110 to 150° C. In order to achieve sufficient surface crystallization, the contact time with the cooling fluid can also be extended to up to 20 minutes, more particularly to between 1 and 10 minutes. The pellet temperature in this case corresponds to the temperature of the cooling fluid.

Crystallization can take place directly after the pellets have been separated from the cooling fluid. Preferably, further heat is supplied to the pellets during crystallization in order, if possible, to obtain constant exit conditions of the pellets irrespective of their conditions upon entry into the crystallization stage. Heat can be supplied through heated lateral surfaces or internal components of the crystallizer, preferably being supplied by means of a hot process gas, more particularly nitrogen, $CO_2$ or air, wherein the process gas temperature at the entry into the crystallizer should be above the temperature of the pellets at the entry into the pelletizer and is preferably 10 to 100° C., more particularly at least 20° C. above the temperature of the pellets upon entry into the pelletizer. The quantity of process gas should normally be sufficient to move, more particularly to fluidize, the pellets during crystallization. Depending on pellet size, conduit speeds from 0.5 to 5 in/sec, more particularly from 0.8 to 2.5 msec, are required for this purpose. If processing polyethylene terephthalate or one of the copolyesters thereof, there is a pellet temperature at the exit from the crystallizer of between 140 and 200° C., more particularly between 150 and 180° C. The mean retention time in the crystallizer may be between 0.5 and 30 minutes, more particularly between 1 and 10 minutes.

Crystallization can be followed by a stage for the separation of coarse fractions, agglomerates and/or fine fractions, as described, for example, in WO01/12698, Borer et. al.

Preferably, in the processes according to the invention, crystallization can be followed by post-condensation of the thus produced crystalline pellets. Alternatively, having been separated from the cooling fluid, the pellets can be cooled and treated at a later point in time.

In addition to the processes according to the invention, the invention also provides a strand pelletizer for the production of pellets of polymers of thermoplastic polyesters or copolyesters from a polyester melt, wherein said strand pelletizer is also capable, if necessary, of implementing the processes according to the invention, in which case said strand pelletizer will also contain any required specific equipment corresponding to the corresponding features of the hereinbefore described processes and/or serving for the implementation thereof. Said strand pelletizer can also be fed with other suitable materials and can produce pellets from other materials. The strand pelletizer according to the invention comprises: die orifices through which the polyester melt issues in the form of strands; a discharge chute, said discharge chute carrying the strands under the action of a fluid; a pelletization device and draw-in rollers, said draw-in rollers pulling the strands from the die orifices and feeding them through the discharge chute to the pelletization device. According to the invention, a flooding means is provided between the die orifices and the discharge chute, said flooding means subjecting the strands, upon issuing from the respective die orifices, to a flood of cooling fluid before the strands are guided by the fluid-carrying discharge chute. Consequently, the unguided strands issuing from the respective die orifices are subjected to a flood of cooling fluid before the strands are guided by the fluid-carrying discharge chute. According to the invention, being subjected to a flood of fluid by the flooding means according to the invention means, in this connection, that the respective strands are completely or more or less completely surrounded by cooling fluid and are directed or supplied by the thus present stream of cooling fluid to the discharge chute. Normally, the cooling fluid supplied to the discharge chute and to the flooding device is essentially circulated in a circuit, it being possible for said circulation circuit to include further components, such as heat exchangers, containers, filters, pumps and connecting pipes. In addition, a supply pipe for fresh cooling fluid is provided. The discharge chute and the flooding device can be connected to just one or to individually controlled heat exchangers. It is also possible for the flooding device to be connected directly to a supply pipe with fresh cooling fluid.

The strand pelletizer according to the invention provides in simple manner the essentially secure guiding and reliable cooling in the strand pelletizer of the strands issuing from the respective die orifices. The lack of guiding, in the prior art, of the extruded strands between the die orifices and the discharge chute, which, in the prior art, can easily lead to strand tearing, depending, for example, on the material being used, is therefore avoided according to the invention, it additionally being the case according to the invention that the cooling fluid is able to act quickly and effectively on the strands as they are being extruded from the die orifices. According to the invention, therefore, the material properties of the strand upon exit from the die orifice can be "frozen".

Preferably, provided between the die orifices and the flooding device of the strand pelletizer according to the invention is an air gap through which the strands are freely transported, more particularly being freely transported over a short distance, the length of the air gap being no more than 30 mm, preferably no more than 10 mm, more preferably no more than 5 mm and still more preferably no more than 2 mm. Alternatively, it is possible for the strand pelletizer according to the invention to have no such air gap.

An air gap may be used, or not, depending on the material that is being extruded.

The strand pelletizer according to the invention can, particularly on account of its "freezing effect", also be employed for the hereinbefore described process according to the invention, wherein, insofar as applicable, the information given in relation to the above process according to the invention will also apply analogously to the strand pelletizer according to the invention.

In addition to the processes according to the invention and the strand pelletizer according to the invention, the invention also provides pellets of polymers of thermoplastic polyesters or copolyesters. Such pellets can be produced by the process according to the invention and by means of the strand pelletizer according to the invention.

The pellets according to the invention consist of thermoplastic polyesters or copolyesters. The pellets are produced with a strand pelletizer, whereby the resulting pellets are essentially cylindrical in form, a typical cylinder length being between 0.3 and 10 mm, with cylinder lengths from 1 to 5 mm being preferred. A typical cylinder diameter is from 0.2 to 8 mm, with cylinder diameters from 0.5 to 5 mm being preferred.

It is desired that the pellets should be essentially solid. Expanded pellets whose density is reduced by gas inclusions or which have an open-celled foam structure are not preferred. Preferred are pellets whose measured weight deviates by less than 10% from their weight as calculated from pellet volume and polymer density.

The pellets are essentially amorphous, wherein there is a DSC-measured crystallinity of whole pellets of less than 10%, more particularly less than 7%, preferably less than 5%.

The pellets according to the invention have a part-crystalline structure in the region of their lateral surface. The part-crystalline structure in the region of the lateral surface has a layer thickness of at least 5 µm, preferably at least 10 µm, the layer thickness being limited to no more than 10% of the pellet radius or approximately 100 µm.

Preferably, the pellets have a highly nucleated structure in the region of their lateral surface, it being desirable that there should be at least a ten times higher nucleation density than in the more stress-free region of the material.

In comparison with conventionally produced pellets, such a surface layer has a significantly reduced tendency to stick during a subsequent crystallization process, and there is also a reduction of the tendency to stick during a subsequent solid-phase polycondensation process, this allowing approximately 5 to 15° C. higher treatment temperatures.

As already stated, by increasing the mechanical loading, it is possible, according to the invention, to achieve desired material properties and/or surface properties of the extruded strand and of the therefrom produced pellets and for said properties to be "frozen" by means of suitable cooling. According to the invention, this can, as described, be realized in several ways, it being possible for the proposed processes and devices with their possibly different specific features to be realized individually or in any desired, possible combination, it being possible, precisely if combining several of the possibilities according to the invention, also to accomplish synergy effects that are capable of rendering corresponding processes and/or devices according to the invention even more effective and reliable.

Hereinbelow, the invention is explained in greater detail on the basis of nonlimiting, illustrative preferred embodiments with reference to the appended drawings, in which:

FIG. 1 shows a diagrammatic view of a strand pelletizer according to the invention; and FIGS. 2a to c each show details according to the invention of detail A from FIG. 1.

FIG. 1 shows a diagrammatic view of a strand pelletizer device according to an embodiment of the present invention, said strand pelletizer device being capable of implementing the entire process of pellet production if appropriately designed according to the invention, if necessary particularly also using the processes according to the invention. The strand pelletizer device presented diagrammatically in FIG. 1 comprises a strand pelletizer for the production of pellets of polymers of thermoplastic polyesters or copolyesters from a polyester melt. If necessary, it is also possible to process other materials with said strand pelletizer device. The strand pelletizer is provided with die orifices 1 (only one shown) through which the polyester melt issues in the form of strands 2 (only one shown), with a discharge zone or discharge section, here, for example, in the form of a discharge chute 3 carrying the strands 2 under the action of a fluid, with a pelletization device 4 and draw-in rollers 5, said draw-in rollers 5 pulling the strands 2 from the die orifices 1 and feeding them through the discharge chute 3 to the pelletization device 4, wherein the extruded strands 2 issue from the die orifices 1 at an exit speed $v_{aus}$ and are supplied, through adjustment of the speed of the draw-in rollers 5, to the pelletization device 4 at a strand removal speed $v_{ab}$. The equipment according to the invention of the strand pelletizer in FIG. 1 is indicated more fully in detail A, said detail A being identified by a circle in FIG. 1. The specific embodiments of said detail A according to the invention are presented and described in FIGS. 2a to c.

With further reference to FIG. 1, having passed through the pelletization device, the pellets 11 are further carried in the fluid stream and are supplied via a post-cooling section 12 to a pellet dryer 13, which pellet dryer 13 has a motor M by which the pellets are kept in motion. The pellet dryer 13 delivers amorphous pellets 14, which are supplied via a connection 15 from the pellet dryer to a crystallizer 16. Said crystallizer 16 is supplied, via a fan 18 and a gas heater 17, with heated gas, with the result that further (thorough) crystallization of the pellets can be performed there in the crystallizer 16. The overall process presented in FIG. 1 results in the crystallized pellets at 19.

FIGS. 2a to c present three different embodiments of the strand pelletizer according to the invention from FIG. 1, FIGS. 2a to c each presenting a flooding means 6 arranged, according to the invention, between the die orifices 1 and the discharge chute 3, wherein said flooding means 6 subjects the unguided strands 2 issuing from the respective die orifices 1 (or the actually unguided strands 2) to a flood of cooling fluid 7 before the strands 2 are guided by the fluid-carrying discharge chute 3. In the region of the discharge chute 3 there may additionally be provided a strand cooling means 9 which, by spraying on additional cooling fluid, further cools the strands 2 as they are being guided in the fluid-carrying discharge chute 3. Furthermore, FIGS. 2a to c each additionally show a fluid supply 10 for subjecting the strands 2 in the discharge chute 3 to fluid.

According to the invention, in the embodiments presented in FIGS. 2a to c, the unguided strands 2 are subjected to the flood of cooling fluid 7, the strands 2 being completely surrounded by cooling fluid and being subjected to fluid while being transported to the fluid-carrying discharge chute 3. Consequently, the subjection of the strands 2 to fluid is uninterrupted between the flooding means 6 and the fluid-carrying discharge chute 3. According to the invention, this provides the advantage, on the one hand, of an initial cooling by the flood of cooling fluid 7 and, on the other hand, of an improved supply of the strands 2, transported in the flood of cooling fluid 7, to the discharge chute 3, i.e. the flooding means 6 according to the invention delivers a flood of fluid 7 in which the strands 2 are transported or guided in particular without any additional (mechanical) guiding means to the discharge chute 3.

The flooding means 6 according to the invention may be so designed as to be directly adjacent, without further air gap 8, to the die orifice 1, it even being possible for the die orifice 1 to be immersed in the flooding means 6 (FIG. 2a); or between the flooding means 6 and the respective die orifice 1 there may be provided such an air gap 8 through which the strands 2 are freely transported, the length of the air gap being no more than 30 mm, preferably no more than 10 mm, more preferably no more than 5 mm and still more preferably no more than 2 mm (FIGS. 2b and 2c).

The flooding means 6 according to the invention may be in the form of a type of chute or trough, the strands 2 passing through corresponding openings or a corresponding opening (FIGS. 2a and 2b); or the flooding means 6 may be formed by nozzles which surround the respective strands 2 with the flood of cooling fluid 7 (FIG. 2c), it being possible, depending on the geometry, for there to be one or more such flooding nozzles. The nozzles which, in the embodiment presented in FIG. 2c, form the flooding means 6 may have any desired orientation with respect to the strands 2; they are preferably downwardly inclined at an angle to the transport direction of the strands 2. FIG. 2c presents, according to the therein shown embodiment, two such flooding nozzles of the flooding means 6.

The die orifices 1 of the strand pelletizer according to the invention may be part of a die plate or feeder head.

EXAMPLE 1

A polyethylene terephthalate copolymer with 2% IPA, a DSC-measured melting temperature of 245° C. and an intrinsic viscosity of 0.6 dl/g was extruded through a die orifice at 60 kg/h at a melt temperature of 280° C. The die orifice opening at the exit had a diameter of 2 mm and a length of 1 mm; 7 mm before the exit, the die orifice had a diameter of 14 mm. Accordingly, this resulted in the following key data: l/d=0.5; F/f=49; $v_{aus}$=261 m/min; $v_{aus}$/f=83 m/(min*mm$^2$).

The die orifice temperature was 230° C. After a distance of 4 mm after exiting the die orifice, the strand was subjected to water at a temperature of 84° C. and was then supplied to a pelletization device via a 3.2 m long discharge chute likewise subjected to water at a temperature of 84° C. The strand removal speed was 200 m/min, this resulting in pellets of 3 mm length and 15 mg in weight. The retention time up to pellet formation was approximately 1 second.

Via a 1.2 m long supply pipe, the pellets and the water were passed to a pellet dryer, in which the pellets were separated from the water. The retention time in the supply pipe was likewise 1 second and was 0.2 seconds in the pellet dryer. The dried pellets were transferred directly to a fluidized-bed crystallizer with 0.05 m$^2$ sieve tray area. The temperature of the pellets upon entry into the crystallizer was 96° C. The crystallizer was supplied with 3.7 Nm$^3$/min of air at 180° C., which resulted in a pellet temperature of 163° C. The mean retention time was 9 minutes. The pellets were homogeneously crystallized. There was no clumping.

EXAMPLE 2

Immediately after exiting the pellet dryer, pellets from example 1 were quenched, dried in a vacuum at 60° C. and then crystallized in a container, without agitatation, for 20 minutes at 170° C.

The pellets were free-flowing, 88% being in the form of single pellets, with 12% forming small agglomerates, wherein agglomeration took place in each case over the cut surfaces of the pellets.

A thin section of 2 μm thickness showed a crystal structure of approximately 5 μm crystal diameter at the centre of a pellet, the average crystal diameter becoming smaller towards the outside. At the edge, there was an approx. 40 μm thick layer in which the individual crystals were so small that, given the available specimen thickness, a structure was no longer visible, this resulting in a crystal diameter <1 μm. Accordingly, the nucleation density in a surface layer of approx. 40 μm was greater than at the centre by a factor >125.

COMPARISON EXAMPLE 1

The experiment from example 1 was repeated, but at a die orifice temperature of 280° C. Agglomerates were formed immediately in the crystallizer. The fluidized bed broke down. Operation was not possible.

COMPARISON EXAMPLE 2

Similarly to example 2, crystallization was carried out using pellets from comparison example 1. The pellets were no longer free-flowing. Large agglomerates were formed which were clumped together also over their cylindrical surfaces.

EXAMPLE 3

A polyethylene terephthalate copolymer as in example 1 was extruded through two die orifices at 200 kg/h at a melt temperature of 276° C. The die orifice openings at the exit had a diameter of 5 mm and a length of 1 mm; 5 mm before the exit, the die orifices had a diameter of 18.3 mm. Accordingly, this resulted in the following key data: l/d=0.2; F/f=13.4; $v_{aus}$=70 m/min; $v_{aus}$/f=3.5 m/(min*mm$^2$).

The die orifice temperature was 260° C. After a distance of 4 to 5 mm after exiting the die orifice, the strand was subjected to water at a temperature of 84° C. and was then supplied to a pelletization device via a 2.2 m long discharge chute likewise subjected to water at a temperature of 84° C. The strand removal speed was 250 m/min, this resulting in pellets of 3 mm length and 20 mg in weight. The retention time up to pellet formation was approximately 0.5 seconds. Via a 1.2 m long supply pipe, the pellets and the water were passed to a pellet dryer, in which the pellets were separated from the water. The retention time in the supply pipe was 1 second and was 0.2 seconds in the pellet dryer. The dried pellets were transferred directly to a fluidized-bed crystallizer with 0.05 m$^2$ sieve tray area. The temperature of the pellets upon entry into the crystallizer was 127° C. The crystallizer was supplied with 3.7 Nm$^3$/min of air at 180° C., which resulted in a pellet temperature of 163° C. The mean retention time was 2.8 minutes. Despite the short retention time and the (in relation to the product) small quantity of gas (gas mass flow/product mass flow=1.44), the pellets were homogeneously crystallized and there was no clumping. The strands issuing from the die orifices were slightly turbid. Pellets that were quenched after the pellet dryer exhibited a rough surface.

COMPARISON EXAMPLE 3

Example 3 was repeated, but the polyester strands were not subjected to water after exiting from the die orifices. Directly after the end of subjection to water, agglomerates were formed immediately in the crystallizer. The fluidized bed broke down. Operation was not possible. The strands issuing from the die orifices remained clear. Pellets that were quenched after the pellet dryer exhibited a smooth surface.

COMPARISON EXAMPLE 4

The experiment from example 3 was repeated, but with die orifices with a die orifice length of 5 mm; 5 mm before the exit, the die orifices had a diameter of 5 mm. Accordingly, this resulted in the following key data: l/d=1; F/f=1; $v_{aus}$=70 m/min; $v_{aus}$/f=3.5 m/(min*mm$^2$). Agglomerates were formed in the crystallizer. The fluidized bed broke down. Operation was not possible.

What is claimed is:

1. A process comprising producing pellets of polymers of thermoplastic polyesters or copolyesters from a polyester melt with a strand pelletizer in which the polyester melt is supplied to die orifices and is thereafter supplied in the form of strands via a discharge section to a pelletization device with draw-in rollers, wherein a strand removal speed $v_{ab}$ is adjusted via the draw-in rollers, wherein the strands exit the die orifices at an exit speed $v_{aus}$ of at least 110 m/min, wherein a relationship of exit speed $v_{aus}$ divided by the area f of the die orifice opening of a respective die orifice $v_{aus}$/f is configured such that the condition $v_{aus}/f \geq 30$ m/(min×mm$^2$) is satisfied, and wherein the strands thus issuing from respective die orifices are brought into contact with a cooling fluid.

2. The process according to claim 1, wherein, upon exit of the strands, a stretching $V=(v_{ab}-v_{aus})/v_{aus}$ of the issuing strands is configured such, that the condition $V \leq 0$ is satisfied.

3. The process according to claim 1, wherein the exit speed $v_{aus}$ is adjusted in a range from at least 110 m/min to at most 600 m/min.

4. The process according to claim 1, wherein the strand removal speed $v_{ab}$ is adjusted in a range from at least 80 m/min to at most 350 m/min.

5. The process according to claim 1, wherein the area f of the die orifice opening of the respective die orifice is adjusted to less than 12 mm².

6. The process according to claim 1, wherein the diameter d and/or length l of the die orifice opening of the respective die orifices is configured such that the relationship l/d satisfies the condition l/d≦1.

7. The process according to claim 1, wherein the strands issuing from the die orifices are brought across (m air gap into contact with a cooling fluid, the length of the air gap being adjusted to no more than 30 mm.

8. The process according to claim 1, wherein the pellets have a highly nucleated structure in the region of their lateral surface.

9. The process according to claim 8, wherein the highly nucleated structure has a layer thickness of at least 5 μm, more particularly at least 10 μm.

10. The process according to claim 1, wherein the pellets have a part-crystalline structure in the region of their lateral surface.

11. The process according to claim 10, wherein the part-crystalline structure has a layer thickness of at least 5 μm, more particularly at least 10 μm.

12. The process according to claim 10, wherein the part-crystalline structure has a crystallization degree of at least 10%, more particularly at least 15%.

13. The process according to claim 1, wherein the cooling fluid has a temperature T which is in the range T1 to T2, where T1=Tg−20° C. and T2=Tg+70° C. and where Tg corresponds to the glass transition temperature of the thermoplastic polyester.

14. The process according to claim 1, wherein the polyester melt is supplied to the die orifices at a melt temperature $T_{melt}$≦280° C.

15. The process according to claim 1, wherein the die orifice temperature is 10 to 60° C. lower than the melt temperature.

16. The process according to claim 1, wherein a contact time of the polyester melt with the cooling fluid is in the range from 0.3 to 10 seconds.

17. The process according to claim 1, wherein the pelletization of the strands in the pelletization device is followed directly by heat treatment of the pellets.

18. The process according to claim 17, wherein the heat treatment includes crystallization.

19. The process according to claim 18, wherein crystallization is effected in a crystallization chamber by means of a process gas stream, wherein the temperature of the process gas at the entry into the crystallization chamber is higher than the temperature of the pellets at the exit from the crystallization chamber.

20. The process according to claim 1, wherein the pelletization of the strands in the pelletization device is followed directly by the crystallization of the thus produced pellets.

21. The process according to claim 1, wherein there is post-condensation of the thus produced pellets.

* * * * *